(12) United States Patent
Swensen et al.

(10) Patent No.: US 10,669,497 B2
(45) Date of Patent: Jun. 2, 2020

(54) TRANSPORTABLE COMBUSTIBLE GASEOUS SUSPENSION OF SOLID FUEL PARTICLES

(71) Applicant: OMNIS ADVANCED TECHNOLOGIES, Santa Barbara, CA (US)

(72) Inventors: James S. Swensen, Santa Barbara, CA (US); Simon K. Hodson, Santa Barbara, CA (US)

(73) Assignee: OMNIS ADVANCED TECHNOLOGIES, LLC, Santa Barbara, CA (US)

( * ) Notice: Subject to any disclaimer, the term of this patent is extended or adjusted under 35 U.S.C. 154(b) by 0 days.

(21) Appl. No.: 15/863,339

(22) Filed: Jan. 5, 2018

(65) Prior Publication Data

US 2018/0195018 A1    Jul. 12, 2018

Related U.S. Application Data

(60) Provisional application No. 62/443,351, filed on Jan. 6, 2017.

(51) Int. Cl.
*C10L 10/18* (2006.01)
*C10L 10/00* (2006.01)
(Continued)

(52) U.S. Cl.
CPC ............. *C10L 10/18* (2013.01); *B65G 53/04* (2013.01); *B65G 53/521* (2013.01); *B65G 53/58* (2013.01); *C10L 5/04* (2013.01); *C10L 5/32* (2013.01); *C10L 5/366* (2013.01); *C10L 5/40* (2013.01); *C10L 5/406* (2013.01); *C10L 5/44* (2013.01); *C10L 10/00* (2013.01); *C10L 2200/0469* (2013.01); *C10L 2230/14* (2013.01);
(Continued)

(58) Field of Classification Search
None
See application file for complete search history.

(56) References Cited

U.S. PATENT DOCUMENTS 1,736,243 A * 11/1929 Bailey .................. F23K 3/00
                                                   222/227
2,709,675 A *  5/1955 Phinney ................ C10B 49/10
                                                    201/31
(Continued)

FOREIGN PATENT DOCUMENTS

DE           2643298 A1 *  4/1978  .............. C10J 3/482

*Primary Examiner* — William R Harp
(74) *Attorney, Agent, or Firm* — Kirton McConkie; Evan R. Witt (57) ABSTRACT

A transportable and combustible gaseous suspension includes solid fuel particles suspended in a gaseous carrier. The solid fuel particles have a sufficiently small particle size so that they remain suspended during transportation. The gaseous carrier may include reactive and inert gases. The solid fuel particles may include coal-derived solid carbonaceous matter. Other examples of solid fuel particles include biomass, refined bioproducts, and combustible polymer particles. The combustible gaseous suspension can be tailored to have an energy density at atmospheric pressure which is comparable to conventional gaseous hydrocarbon fuels. The gaseous combustible fuel may be pressurized to a pressure in the range from 2 to 100 atmospheres.

20 Claims, 4 Drawing Sheets

(51) Int. Cl.
*C10L 5/44* (2006.01)
*C10L 5/40* (2006.01)
*B65G 53/52* (2006.01)
*B65G 53/04* (2006.01)
*B65G 53/58* (2006.01)
*C10L 5/04* (2006.01)
*C10L 5/32* (2006.01)
*C10L 5/36* (2006.01)

(52) U.S. Cl.
CPC ....... *C10L 2250/04* (2013.01); *C10L 2250/06* (2013.01); *C10L 2270/10* (2013.01); *C10L 2290/20* (2013.01); *Y02E 50/10* (2013.01); *Y02E 50/30* (2013.01)

(56) References Cited

U.S. PATENT DOCUMENTS

| | | | | |
|---|---|---|---|---|
| 2,842,319 | A | | 7/1958 | Reerink et al. |
| 3,347,599 | A | * | 10/1967 | Topper .................. B65G 53/66 406/197 |
| 4,019,783 | A | * | 4/1977 | Kayser .................. B65G 53/14 406/130 |
| 4,548,529 | A | * | 10/1985 | van der Burgt ........... B01J 3/02 406/124 |
| 4,603,810 | A | * | 8/1986 | Schleimer ................ C21C 5/32 239/1 |
| 4,613,084 | A | * | 9/1986 | Takamoto ............... C10L 1/326 241/16 |
| 4,702,181 | A | * | 10/1987 | Brown ..................... B04C 5/13 110/264 |
| 8,100,095 | B2 | * | 1/2012 | McKnight ................. F23D 1/00 123/1 A |
| 8,163,045 | B2 | * | 4/2012 | Kunik ...................... C10L 5/36 44/530 |
| 9,017,432 | B2 | | 4/2015 | Brooks et al. |
| 2009/0188165 | A1 | * | 7/2009 | Ariyapadi ............... C10J 3/463 48/210 |
| 2009/0214992 | A1 | * | 8/2009 | McKnight ................. F23R 5/00 431/12 |
| 2015/0362185 | A1 | * | 12/2015 | Van Thorre ............. C10L 5/366 110/345 |
| 2018/0105760 | A1 | * | 4/2018 | Swensen ................. C10L 3/003 |

* cited by examiner

TRANSPORTABLE COMBUSTIBLE GASEOUS SUSPENSION OF SOLID FUEL PARTICLES

CROSS-REFERENCE TO RELATED APPLICATION

This application claims the benefit of U.S. Provisional Application No. 62/443,351, filed Jan. 6, 2017, and entitled COMBUSTIBLE GASEOUS SUSPENSION OF SOLID FUEL PARTICLES. This prior application is incorporated by reference.

BACKGROUND OF THE INVENTION

This disclosure relates to a transportable combustible gaseous suspension of solid fuel particles. The gaseous suspension includes solid fuel particles suspended in a carrier gas. The gas may be reactive such as air, oxygen, mixtures thereof, or the gas may be inert, such as nitrogen. The gaseous suspension of solid fuel particles may be configured to have energy characteristics similar to conventional gaseous hydrocarbon fuels.

BACKGROUND

The energy density of combustible fuels is a measure of the amount of thermal energy produced by combustion per unit volume. Table 1, below, lists a typical volumetric energy density for four common combustible gases at normal temperature and pressure (NTP). Normal temperature and pressure is understood to be at 20° C. and 1 atm.

TABLE 1

Volumetric Energy Density of Selected Combustible Gases

| Combustible Gas | Heat Content (Btu/lb) | Volumetric Energy Density (Btu/m$^3$) |
|---|---|---|
| Natural Gas | 21,000 | 37,038 |
| Methane | 23,811 | 35,698 |
| Propane | 21,564 | 89,471 |
| Butane | 21,640 | 118,745 |

It would be an advancement in the art to provide an affordable substitute to conventional combustible gases. It would be a further advancement in the art to provide a combustible gas in which the volumetric energy density can be modified as needed to meet energy requirements for the combustible gas. It would be a further advancement in the art to provide a combustible gas that is transportable comparable to conventional combustible gases.

SUMMARY OF THE INVENTION

This disclosure relates to a transportable combustible gaseous suspension of solid fuel particles. The combustible gaseous suspension comprises predominantly, by volume, a gaseous carrier in which solid fuel particles are suspended to provide a combustible gas having an energy density comparable to conventional gaseous hydrocarbon fuels. Non-limiting examples of gaseous hydrocarbons fuels include natural gas, methane, ethane, propane, butane, and gaseous derivatives thereof. The gaseous carrier may be reactive or inert. Non-limiting examples of reactive gases include air, oxygen, and mixtures thereof. A non-limiting example of an inert gas includes nitrogen.

The solid fuel particles have a sufficiently small particle size to remain suspended during transport and use. This is affected by both the density of the solid fuel particles and the density of the gaseous carrier within which the solid fuel particles are suspended. The solid fuel particles will typically have a particles size less than 60 μm, and preferably less than 40 μm. In some non-limiting embodiments, the solid fuel particles may have a particle size less than 30 μm. In some non-limiting embodiments, the solid fuel particles have a particle size less than 20 μm. The solid fuel particles may have a particle size less than 10 μm. The solid fuel particles may have a particle size less than 5 μm. In some embodiments, the solid fuel particles have an average particle size less than 20 μm. In some non-limiting embodiments, the solid fuel particles have an average particle size less than 10 μm. In other non-limiting embodiments, the solid fuel particles have an average particles size less than 5 μm. The solid fuel particles may have an average particle size less than 2.5 μm.

The solid fuel particles comprise finely-divided particles of an energetic or combustible fuel material. The solid fuel particles may be derived from a single source of energetic or combustible fuel materials or a blend or mixture of different energetic or combustible fuel materials may be used. In one non-limiting embodiment the solid fuel particles comprise fine coal particles, including coal-derived carbonaceous matter. When coal-derived carbonaceous matter has a sufficiently small size to be substantially free of inherent mineral matter, then it is referred to as coal-derived solid hydrocarbon. In some embodiments the solid fuel particles comprise coal-derived solid hydrocarbon particles.

In some embodiments, the coal-derived solid carbonaceous matter contains reduced amounts of coal-derived mineral matter and reduced amounts of sulfur. In one non-limiting embodiment, the coal-derived solid carbonaceous matter contains less than 1 wt. % coal-derived mineral matter. In one non-limiting embodiment, the coal-derived solid carbonaceous matter contains less than 0.5 wt. % sulfur.

The solid fuel particles suspended in the gaseous carrier disclosed herein are sometimes referred to as Micro Clean Carbon Fuel (μCCF).

A dispersant may be used with the coal-derived solid carbonaceous matter to inhibit agglomeration of the fine particles. In one non-limiting embodiment, the dispersant comprises an organic acid. The dispersant may be an organic acid selected from linear, cyclic, saturated, or unsaturated carboxylic acid and polycarboxylic acids. In one currently preferred embodiment, the dispersant is citric acid. In another non-limiting embodiment, the dispersant is a lignosulfonate-based surfactant. Another dispersant class that may be used include non-ionic dispersants such as polyethylene oxide dispersants.

The solid fuel particles may also be derived from organic materials, including waste organic materials. In still another embodiment, the solid fuel particles are derived from waste biomass. Further, the solid fuel particles may be a refined bioproduct, such as sugars, starches, cellulose, flour, etc. Even further, the solid fuel particles may consist of any naturally occurring or synthesized solid fuel compound, including polymers, e.g. any carbonaceous material.

An object of the invention is to provide a combustible gaseous suspension of solid fuel particles that has a volumetric energy density comparable to that of conventional gaseous hydrocarbon fuels.

In one non-limiting embodiment, the solid fuel particles have a size less than 30 μm and an energy density greater than 5000 Btu/lb. In another non-limiting embodiment, the solid fuel particles have a size less than 30 microns and a density greater than 500 kg/m³. In yet another non-limiting embodiment, the solid fuel particles have an energy density greater than 5000 Btu/lb and a density greater than 500 kg/m³. It will be appreciated that solid fuel particle size, energy density, and density values may vary. For example, bituminous coals may have an energy density on a dry basis in the range from 12,500 to 15,000 Btu/lb, whereas lower rank coals and biosolids may have an energy density on a dry basis in the range from 10,000 to 13,000 Btu/lb. Water associated with the solid fuel lowers the energy density. Partially oxidized solid fuel particles have a lower energy density compared to non-oxidized fuel particles.

In one non-limiting embodiment, the gaseous carrier is air, the solid fuel particles comprise coal-derived solid carbonaceous matter and have a particle size less than 10 μm, and the combustible gaseous suspension of solid fuel particles has a volumetric energy density at atmospheric pressure which is in the range of 25,000 to 120,000 Btu/m³.

In one non-limiting embodiment, the combustible gaseous suspension has a pressure in the range from 2 to 100 atmospheres. Pressurization enables the combustible gaseous suspension to be transported via pressurized gas distribution pipelines. In China, for example, natural gas is distributed at a pressure of about 60 atmospheres. In the United States, natural gas is distributed at a pressure of about 100 atmospheres.

A method of transporting a combustible gaseous suspension may include suspending solid fuel particles in a gaseous carrier to form a combustible gaseous suspension. The combustible gaseous suspension may be pressurized to a pressure suitable for transport. Such pressures typically range from about 60 to 100 atmospheres (atm) for long distance transportation. Residential gas distribution lines range from about 1 to 7 atm (15 to 120 pounds per square inch (psi)). Gas distribution going into homes is often regulated down to about 0.25 psi.

In one non-limiting embodiment of the method of transporting a combustible gaseous suspension, the combustible gaseous suspension comprises greater than 90 volume % carrier gas and the solid fuel particles comprise coal-derived solid carbonaceous matter and have a particle size less than 30 μm.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a graph of the differential volume by particle diameter of the fine particles that exited the top of the cyclone shown in FIG. 1 and the larger particles that exited the bottom of the cyclone. FIG. 2 also shows the particle size distribution of the coal particles fed into the cyclone.

DESCRIPTION OF THE INVENTION

This disclosure relates to a combustible gaseous suspension of solid fuel particles. The gaseous suspension of solid fuel particles may be configured to have energy characteristics similar to conventional gaseous hydrocarbon fuels.

Fine solid fuel particles such as fine coal particles can be suspended in air and transported. This blend of fine solid fuel particles in air behaves like a combustible gas when transported in pipeline and burned at the end of use to produce heat and do work. Such a blend used for transport is a new composition of matter. Table 2 below outlines the weight percent, volume percent, and volumetric energy density for example blends of fine solid fuel particles suspended in air at normal temperature and pressure. Fine coal was used as fine solid fuel particle in the results in the table below. The fine coal particles had a density of 1200 kg/m³ and heat content of 14,500 Btu/lb. Natural gas is the most commonly used combustible gas. A blend of 50 wt. % fine solid fuel particles just described has a volumetric energy density of 39,120 Btu/m³, which is similar to natural gas. The volume percent of solid fuel particles at 50 wt. % is 0.1%. As mass and volume percent increase, the volumetric energy content of the combustible gas formed by suspending fine solid fuel particles in air continues to increase. A blend of 95 wt. % solid fuel particles only has a volume percent of 1.9% and the volumetric energy density is 729,877 Btu/m³, which is about 20 times greater than the volumetric energy content of natural gas at normal temperature and pressure.

TABLE 2

| Combustible gas of air and fine solid fuel particles | | |
|---|---|---|
| Mass % μCCF | Volume % μCCF | Volumetric Energy Density (Btu/m³) |
| 1% | 0% | 396 |
| 10% | 0.01% | 4,351 |
| 20% | 0.03% | 9,787 |
| 30% | 0.04% | 16,775 |
| 40% | 0.07% | 26,089 |
| 50% | 0.10% | 39,120 |
| 60% | 0.15% | 58,650 |
| 70% | 0.24% | 91,155 |
| 80% | 0.41% | 156,002 |
| 85% | 0.58% | 220,628 |
| 90% | 0.91% | 349,228 |
| 95% | 1.90% | 729,877 |

The combustible gaseous suspension of solid fuel particles is a multi-phase fuel composition comprising a blend of suspended solid fuel particles and a gaseous carrier. The gaseous carrier may be reactive or inert. Non-limiting examples of reactive gases include air, oxygen, and mixtures thereof. One non-limiting example of an inert gas is nitrogen.

The solid fuel particles comprise finely-divided particles of an energetic or combustible fuel material. In one non-limiting embodiment the solid fuel particles comprise fine coal particles. More specifically, the fine coal particles comprise coal-derived carbonaceous matter. When milled to a sufficiently small size to be substantially free of inherent mineral matter, coal-derived carbonaceous matter exists as coal-derived solid hydrocarbon. In another non-limiting embodiment the solid fuel particles comprise coal-derived solid hydrocarbon particles.

In another embodiment the solid fuel particles are derived from organic materials, including waste organic materials. In still another embodiment, the solid fuel particles are derived from waste biomass. Non-limiting examples of waste biomass include sawdust, plant cuttings, wood chips, and plant stalks. Further, the solid fuel particles may be a refined bioproduct. Non-limiting examples of a refined bioproduct include sugars, starches, cellulose, flour, etc. Even further, the solid fuel particles may consist of any synthesized solid fuel compound. Non-limiting examples of synthesized solid fuel compounds include which include polymers such as polyethylenes, polypropylenes, polycarbonates, polystyrenes, rubbers, etc. The synthesized solid fuel compounds may be waste organic materials, including waste polymers. Non-limiting examples of waste polymers include used tires, polypropylene grocery bags, and Styrofoam.

The solid fuel particles may be derived from a single source of energetic or combustible fuel materials. Alternatively, the solid fuel particles may be derived from a blend or mixture of different energetic or combustible fuel materials.

The solid fuel particles have a size that enables them to be easily suspended and to remain suspended in the gaseous carrier for a practical period of time during storage, transport, and/or use. Stokes law defines the frictional force or drag force when the Reynold's number is low (e.g. for very small spherical particles) as it passes through a fluid or gas. When the drag force is set equal to the gravitational acceleration force, then a terminal velocity can be calculated for these very small particles. This case assumes no other forces other than the drag of calm air. Thus, Stokes Law can be used to calculate the settling velocity of a sphere of a given density in air or other gasses or liquids if the diameter is less than about 250 microns:

$$V = \frac{d^2 \cdot g}{18 \cdot \eta} \cdot (Ws - Wa)$$

Where d=the geometric diameter of the sphere (m)
Ws=the density of the sphere (kg/m$^3$)
Wa=the density of the air (kg/m$^3$)
g=acceleration due to gravity (m/s$^2$)
$\eta$=the viscosity of the fluid (kg/(m*s))

Table 3 shows the calculated settling velocity of spherical particles in air at normal temperature and pressure for diameters from 0.5 microns up to 60 microns when Ws=1200 kg/m$^3$, Wa=1.2 kg/m$^3$, g=9.8 m/s$^2$, and $\eta$=1.81×10$^{-5}$ kg/(m*s) using a model based on Stokes Law.

TABLE 3

| diameter (μm) | Settling Velocity (m/s) |
|---|---|
| 0.5 | $9.01 \times 10^{-6}$ |
| 1 | $3.61 \times 10^{-5}$ |
| 2.5 | $2.25 \times 10^{-4}$ |
| 5 | $9.01 \times 10^{-4}$ |
| 10 | $3.61 \times 10^{-3}$ |

TABLE 3-continued

| diameter (μm) | Settling Velocity (m/s) |
|---|---|
| 20 | $1.44 \times 10^{-2}$ |
| 30 | $3.25 \times 10^{-2}$ |
| 60 | $1.19 \times 10^{-1}$ |

A gaseous combustible suspension moving at a velocity exceeding the settling velocity of the particles in suspension will keep the particles suspended.

From Stokes Law and the foregoing discussion, it will also be appreciated that particles having a lower density will also possess a lower settling velocity. It is possible to suspend solid fuel particles in a gaseous carrier that have a greater particle size and a lower density compared so smaller and denser solid fuel particles. Thus, different types and sizes of solid fuel particles may be suspended and remain suspended in the combustible gaseous fuel.

As noted above, the solid fuel particles should have a particle size less than 60 μm, and more preferably less than 40 μm. In one non-limiting embodiment, the solid fuel particles have a diameter less than 30 μm. In another embodiment, the solid fuel particles have a diameter less than 20 μm. In yet another embodiment, the solid fuel particles have a diameter less than 10 μm. In one embodiment, the solid fuel particles have a diameter less than 5 μm. In some embodiments, the solid fuel particles have an average particle size less than 20 μm. In some non-limiting embodiments, the solid fuel particles have an average particle size less than 10 μm. In a further embodiment, the solid fuel particles have an average diameter less than 5 μm. In still another non-limiting embodiment, the solid fuel particles have an average size less than 2.5 μm. In a non-limiting embodiment, 99% of the solid fuel particles are less than 40 μm. In one non-limiting embodiment, 99% of the solid fuel particles are all less than 20 μm. In another non-limiting embodiment, 99% of the solid fuel particles are all less than 10 μm. In other non-limiting embodiments, larger size and lower density solid fuel particles may be successfully used.

The time period during which the solid fuel particles remain suspended may vary depending upon the intended use of the combustible gaseous suspension. For example, if the combustible gaseous suspension is prepared on demand for immediate use, then the suspension time period may be short, such as seconds, minutes, or hours. In contrast, if the combustible gaseous suspension is stored for a period of time, then the practical suspension time period may be measured in days, weeks, or months. It will be appreciated that finer sized solid fuel particles will naturally remain suspended for a longer time period compared to larger sized solid fuel particles. A particle having a size of about 10 μm may remain suspended for minutes to hours, whereas a particle having a size of about 2.5 μm may remain suspended for days or weeks.

In one disclosed embodiment, the gaseous carrier comprises air and the suspended solid fuel particles comprise fine coal particles which include coal-derived carbonaceous matter. The amount of coal particles blended with air may range from about 5 volume % or less, at atmospheric pressure. The coal particles may have an average particle size less than 30 μm.

A dispersant may be added to the fine coal particles to reduce particle agglomeration. In one non-limiting embodiment, the dispersant is an organic acid. The dispersant may be an organic acid selected from linear, cyclic, saturated, or unsaturated carboxylic acid and polycarboxylic acids. In one currently preferred embodiment, the dispersant is citric acid. In another non-limiting embodiment, the dispersant is a lignosulfonate based surfactant. Another dispersant class that may be used is non-ionic dispersants such as a polyethylene oxide dispersant.

The following non-limiting examples are given to illustrate several embodiments relating to the disclosed combustible gaseous suspension of solid fuel particles. It is to be understood that these examples are neither comprehensive nor exhaustive of the many types of embodiments which can be practiced in accordance with the presently disclosed invention.

Example 1

An experiment was designed to test whether fine coal particles settle in calm air as predicted by Stokes Law. First, fine coal particles of a defined size were obtained by passing the coal particles through a small cyclone. Cyclones are devices that can be used to classify particles in flowing water or air based on size.

Figure 1:
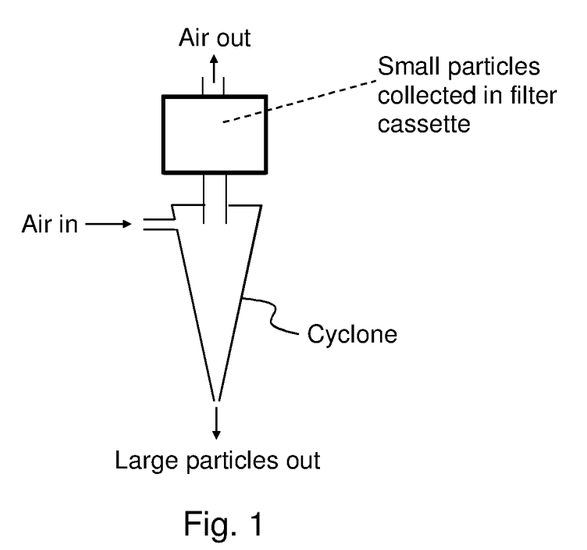
FIG. 1 shows a schematic representation of a cyclone used in some examples to separate solid fuel particles by particle size.
Figure 2:
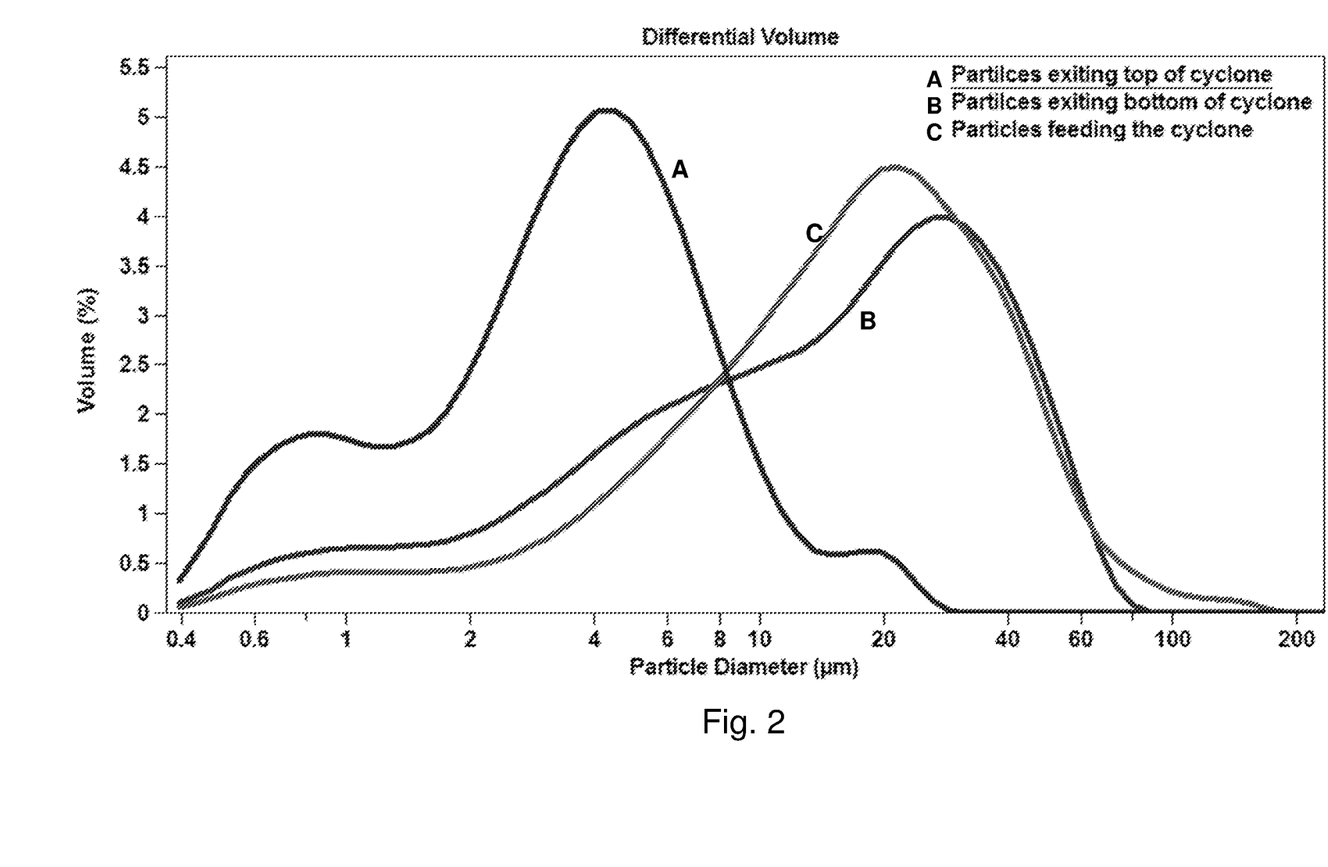

The cyclone used in this experiment is depicted in FIG. 1. It had a bottom opening of about 4.7 mm and a top opening of 14.5 mm and was 105 mm tall. A small vacuum pump operating at a rate of 1.9 liters per minute was connected to the top port of the cyclone. Large particles that fell out of the bottom port were collected in a cap or grit pot. Small particles carried out of the top of the cyclone in the airstream were collected on fine filter paper before entering the vacuum. FIG. 2 shows a particle size analysis graph for the smaller particles that exited the top of the cyclone and the larger particles that exited the bottom of the cyclone. Also shown in FIG. 2 is the particle size distribution of the coal particles that fed into the cyclone. The fine particles exiting the top had an average particles size of 4.4 μm. The large particles exiting the bottom of the cyclone had an average particle size of 18.8 μm.

Figure 3:
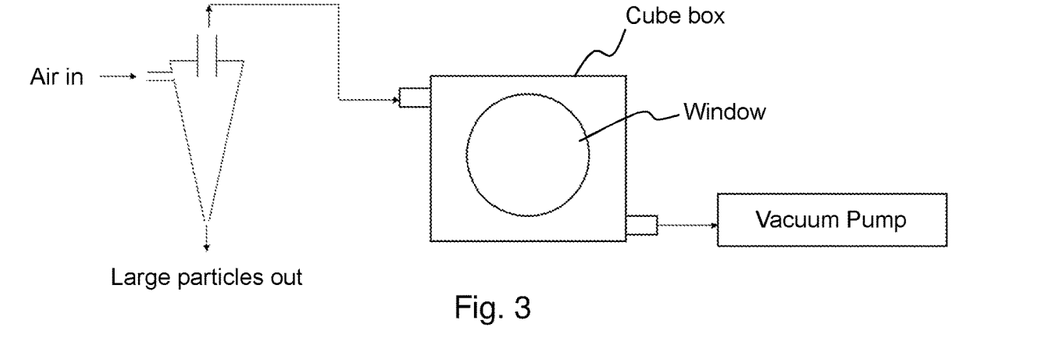
FIG. 3 shows a schematic representation of a cyclone used in some examples to separate solid fuel particles by particle size.
Figure 4:
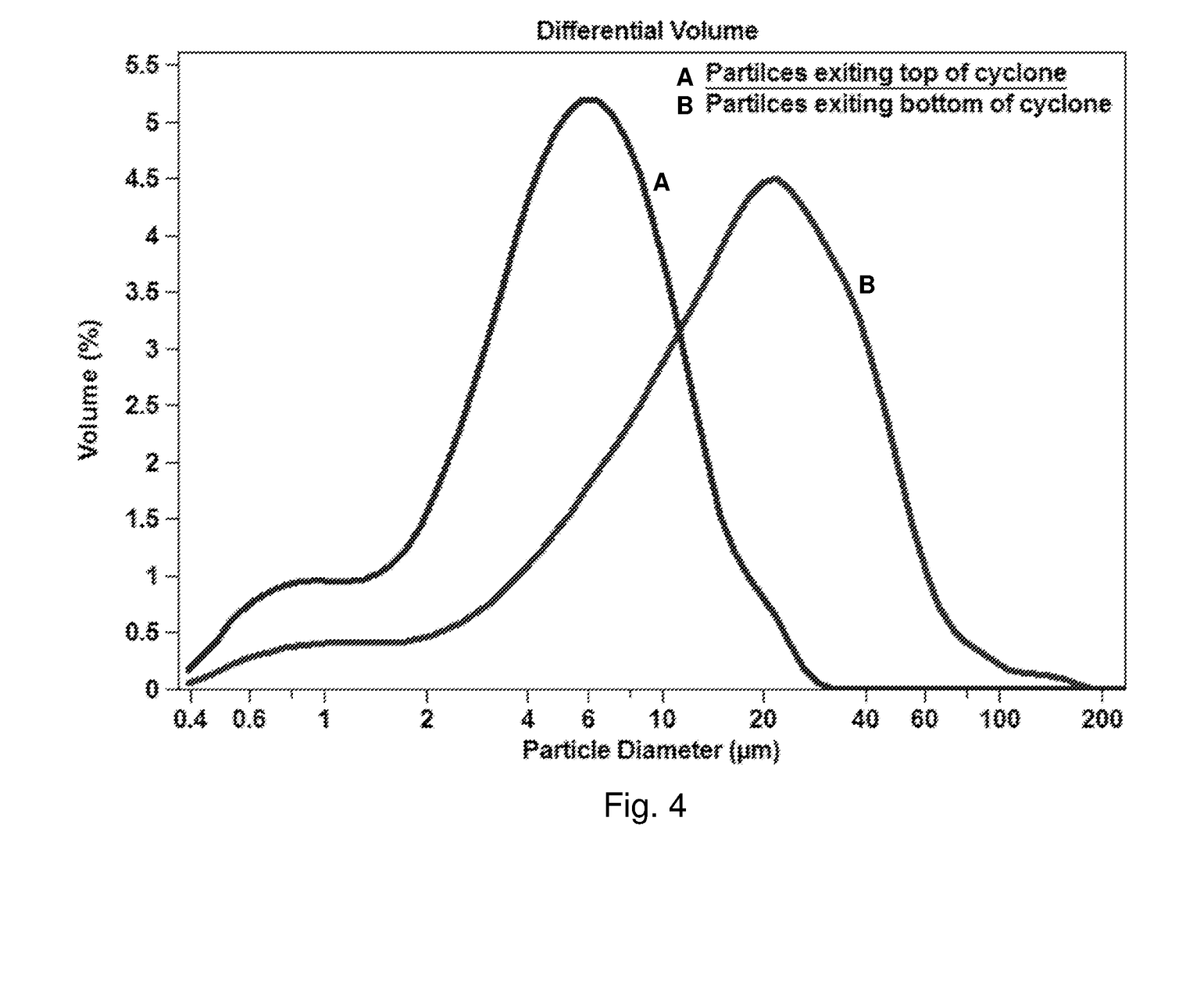
FIG. 4 is a graph of the differential volume by particle diameter of the fine particles that exited the top of the cyclone shown in FIG. 3 and the larger particles that exited the bottom of the cyclone.

The cyclone was then set up as shown in FIG. 3. In this configuration, the fine particles exiting the cyclone were passed through a stainless steel cube box with inside wall lengths of 2.25" with a 1.5" diameter window on two sides so that one could see through the box and see suspended particles. The volumetric air flow of the vacuum pump was measured at 1.9 liters per minute. The tubing going from the cyclone to the steel box and from the steel box to the vacuum pump had a 6.9 mm inside diameter. Based on the volumetric air flow rate of the vacuum pump, the air velocity in the tube was calculated to be 0.85 m/s. The air velocity in the box slows down due to the larger cross-sectional surface are of the container and was calculated to be 0.0096 m/s.

According to Table 3, the settling velocity for particles suspended in air of a 60 μm diameter particle is 0.12 m/s, the settling velocity of a 30 μm particle is 0.033 m/s, the settling velocity of a 20 μm particle is 0.014 m/s, and the settling velocity of a 10 μm particle is 0.0036 m/s. From FIG. 2, some 30 and 60 μm particles are in the feed particles. The air velocity in the tubing is greater than the settling velocity for particles in this range and thus, they should be able to be transported in the tubing. However, the air velocity inside the box is lower than the settling velocity of these particles. Thus, particles larger than 30 microns are not expected to remain in suspension inside the box with the volumetric air flow rate of this experimental setup.

According to Table 3, the settling velocity of a 10 μm particle is 0.0036 m/s. The air velocity inside the box is 0.0096 m/s which is greater than the settling velocity of 10 μm particles. Thus, particles 10 μm and smaller are expected to be in suspension in the box when air is flowing through it at the volumetric rate of 1.9 liters per minute.

When the experimental setup described herein and shown in FIG. 3 was operating, the particles exiting the top of the cyclone and travelling into the box had an average particle size of 4.4 μm. A light shined through the back window of the box. The particles could be observed traveling in the current of air as it expanded from the volume of the tube entering the box to the volume of the box. As long as the pump was left on and particles were being delivered to the cyclone, particles entered and exited the box without settling to the bottom of the box.

When the pump was turned off, the flow of air stopped. The particles could then be observed to slowly drift to the bottom of the box. The time required for the particles to travel 1 cm was measured to be approximately 10 seconds, corresponding to a settling velocity of 0.001 m/s. This settling velocity matches the calculated settling velocity of 0.0009 m/s for a 5 μm diameter particle.

The cyclone was then removed from the experimental setup so that the suction tube fed the particles into the box. As stated above, any 30 μm and 60 μm particles are expected transport in the tubing but are then expected to settle soon after entering the box, based on the calculated air velocity for the two different cross-sectional areas. Particles in the size range of about 10 μm in the feed are expected to remain suspended in the box because the air velocity in the box exceeds their settling velocity.

When the feed was introduced directly into the box by removing the cyclone from the experimental setup, a higher density of particles was visually observed in the box. When the vacuum pump was shut off and air velocity went to zero, the particles were observed to settle more quickly indicating a population of larger diameter particles. The time required for the particles to travel 1 cm was measured to be approximately 0.8 seconds, corresponding to a settling velocity of 0.012 m/s. The air velocity inside the box calculated from the volumetric flow rate and the cross-sectional area was calculated to be 0.0096 m/s, which is slightly lower than the measured settling rate of 0.012 m/s. The visual method for measuring settling rate may not be accurate enough. However, the fact that the two rates are on the same order and so close to one another validates the assumption that air velocity greater than the settling rate of a particle will keep that particle in suspension in a flowing gas. The settling velocity for a 10 μm diameter particle was calculated to be 0.0036 m/s. Thus, the particles must be larger than 10 μm and smaller than 30 μm on average. In fact, a particle with a diameter of 18.25 μm would have a settling velocity in air at normal pressure and temperature of 0.012 m/s.

Example 2

A larger cyclone was used as part of a powder capture system. The large and small dimensions of the cone were 27.5 cm and 7.3 cm, respectively. The cyclone was 61 cm tall. FIG. 4 shows a graph of the differential volume by particle diameter of the large particles exiting the small opening at the bottom of the cyclone and the small particles carried with the airstream exiting the top of the cyclone. The average particle sizes were 21.4 μm and 6.2 μm respectively. Note that the larger particles were the feedstock used for the experiment with the small cyclone discussed in Example 1, above. The fine particles with an average particle size were transported in metal ducting over 50 feet away without significant sedimentation to the sidewalls of the ducting. Once the ducting was coated with a thin film of fine particles due to static charges, losses were negligible.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:

1. A transportable combustible gaseous suspension comprising:

a non-combustible gaseous carrier; and solid fuel particles suspended in the gaseous carrier, wherein the solid fuel particles consist of particles of coal-derived solid carbonaceous matter having a particle size less than 40 μm.

2. The transportable combustible gaseous suspension according to claim 1, wherein the gaseous carrier is selected from air, oxygen, and mixtures thereof.

3. The transportable combustible gaseous suspension according to claim 1, wherein the solid fuel particles have a heat content greater than 5000 BTU/lb.

4. The transportable combustible gaseous suspension according to claim 1, wherein the solid fuel particles have a density greater than 500 $kg/m^3$.

5. The transportable combustible gaseous suspension according to claim 1, wherein the solid fuel particles have a heat content greater than 5000 BTU/lb and a density greater than 500 $kg/m^3$.

6. The transportable combustible gaseous suspension according to claim 1, further comprising a dispersant associated with the coal-derived solid carbonaceous matter.

7. The transportable combustible gaseous suspension according to claim 6, wherein the dispersant comprises an organic acid.

8. The transportable combustible gaseous suspension according to claim 7, wherein the dispersant is citric acid.

9. The transportable combustible gaseous suspension according to claim 7, wherein the dispersant is selected from linear, cyclic, saturated, or unsaturated carboxylic acid and polycarboxylic acids.

10. The transportable combustible gaseous suspension according to claim 1, wherein the solid fuel particles have an average particle size less than 30 μm.

11. The transportable combustible gaseous suspension according to claim 1, wherein the solid fuel particles have a particle size less than 20 μm.

12. The transportable combustible gaseous suspension according to claim 1, wherein the solid fuel particles have a particle size less than 10 μm.

13. The transportable combustible gaseous suspension according to claim 1, wherein the solid fuel particles have a particle size less than 5 μm.

14. The transportable combustible gaseous suspension according to claim 1, wherein the combustible gaseous suspension has a pressure in the range from 2 to 100 atmospheres.

15. The transportable combustible gaseous suspension according to claim 1, wherein the solid fuel particles have a particle size less than 10 μm and the quantity of solid fuel particles is selected to provide the transportable combustible gaseous suspension with a volumetric energy density in the range of 25,000 to 120,000 $Btu/m^3$.

16. A method of transporting a combustible gaseous suspension comprising:

suspending solid fuel particles in a non-combustible gaseous carrier to form a combustible gaseous suspension, wherein the solid fuel particles consist of particles of coal-derived solid carbonaceous matter having a particle size less than 40 μm; and pressurizing the combustible gaseous suspension to a pressure suitable for transport in the range from about 2 to 100 atmospheres, wherein the solid fuel particles have a sufficiently small size to enable them to remain suspended in the gaseous carrier during transport.

17. The method of transporting a combustible gaseous suspension according to claim 16, wherein the solid fuel particles consist of particles of coal-derived solid carbonaceous matter having a particle size less than 20 μm.

18. The method of transporting a combustible gaseous suspension according to claim 16, wherein the solid fuel particles remain suspended in the gaseous carrier during transport via a pressurized natural gas distribution pipeline.

19. A method of transporting a combustible gaseous suspension comprising:

suspending solid fuel particles in a non-combustible gaseous carrier to form a combustible gaseous suspension, wherein the solid fuel particles consist of particles of coal-derived solid carbonaceous matter having a particle size less than 40 μm; and flowing the combustible gaseous suspension through a gaseous fuel distribution pipeline at a velocity exceeding a settling velocity of the solid fuel particles.

20. The method of transporting a combustible gaseous suspension according to claim 19, wherein the solid fuel particles have an average particle size less than 30 μm and the velocity exceeds $3.25\times10^{-2}$ m/s.

* * * * *